United States Patent [19]

Drysdale et al.

[11] Patent Number: 5,235,031

[45] Date of Patent: * Aug. 10, 1993

[54] POLYMERIZATION OF LACTIDE

[75] Inventors: Neville E. Drysdale, Newark; Thomas M. Ford, Greenville; Stephan J. McLain, Wilmington, all of Del.

[73] Assignee: E. I. Du Pont de Nemours and Company, Wilmington, Del.

[*] Notice: The portion of the term of this patent subsequent to Jul. 2, 2008 has been disclaimed.

[21] Appl. No.: 815,107

[22] Filed: Mar. 13, 1992

[51] Int. Cl.$^5$ .................. C08G 63/84; C08G 63/91
[52] U.S. Cl. ............................ 528/354; 525/415; 528/357
[58] Field of Search ............... 525/415; 528/354, 357

[56] References Cited

U.S. PATENT DOCUMENTS

| 3,169,945 | 2/1965 | Hostettler et al. | 260/78.3 |
| 4,289,873 | 9/1981 | Kubo et al. | 528/357 |
| 4,357,462 | 11/1982 | Kubo et al. | 528/357 |
| 5,028,667 | 7/1991 | McLain et al. | 525/415 |

OTHER PUBLICATIONS

Polymer Preprints, Japan (English Edition) vol. 40, 5-11, pp. E830 and E831.
Kidorui 1991, 18, 152-153 (Abstract).

*Primary Examiner*—John Kight, III
*Assistant Examiner*—Shelley A. Dodson

[57] ABSTRACT

A process for polymerizing lactide and up to 20 mole percent of another lactone in the absence of solvent at 100° to 220° C. using an yttrium or lanthanide series rare earth metal catalyst.

14 Claims, No Drawings

POLYMERIZATION OF LACTIDE

BACKGROUND OF THE INVENTION

1. Field of the Invention

The present invention relates to the polymerization of molten lactide (either S or R) using an yttrium or lanthanide series rare earth metal based catalyst.

2. Description of the Related Art

Lactides are presently polymerized to high molecular weight plastics using stannous 2-ethylhexanoate (tin octanoate) as the catalyst by ring opening polymerization of the cyclic ester:

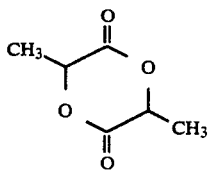

These polymers of lactide are useful in medical applications such as wound closure devices, orthopedic implants, and controlled release drug carriers.

U.S. Pat. No. 5,028,667 discloses the polymerization of various lactones including lactide using yttrium and lanthanide series rare earth based catalysts.

SUMMARY OF THE INVENTION

The present process relates to a process for the polymerization of lactide and optionally up to 20 mole % based on lactide of one or more lactones selected from

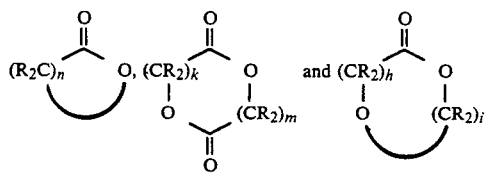

by contacting a melt of lactide and the optional lactone with one or more catalysts having the formula $MZ_3$, wherein n is 4 or 5, h, i, k and m are independently 1 or 2, each R is independently selected from hydrogen or hydrocarbyl containing up to 20 carbon atoms or substituted hydrocarbyl containing up to 20 carbon atoms, M is chosen from yttrium or a lanthanide series rare earth metal, and Z is $-OCR'_3$ where R' is independently chosen from hydrogen, hydrocarbyl and substituted hydrocarbyl. Optionally up to two Zs may be other herein below defined materials.

DESCRIPTION OF THE PREFERRED EMBODIMENTS

The present invention relates to a process for the ring opening polymerization of molten lactide and up to 20 mole % based on lactide of another lactone using as catalysts certain compounds of yttrium or lanthanide series rare earth metal.

The lactones which can be used as comonomers in the process of the present invention include:

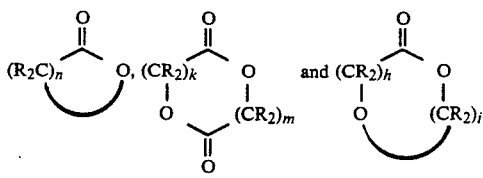

wherein n is 4 or 5, h, i, k and m are independently one or two and each R is independently chosen from H or hydrocarbyl containing up to 12 carbon atoms. Preferred lactones are those in which R is hydrogen or methyl, and especially preferred lactones are epsilon-caprolactone, delta-valerolactone, glycolide (1,4-dioxan-2,5-dione), 1,5-dioxepan-2-one and 1,4-dioxan-2-one.

The catalysts, characterized by the formula $MZ_3$, for this polymerization are compounds of yttrium and the rare earth metals. Rare earth metals include those elements with atomic numbers 57 through 71, namely lanthanum, cerium, praseodymium, neodymium, promethium, samarium, europium, gadolinium, terbium, dysprosium, holmium, erbium, thulium, ytterbium, and lutetium. Preferred metals are yttrium, lanthanum, cerium, samarium and dysprosium. Especially preferred is lanthanum and mixtures of yttrium and rare earth metals that are obtained from the mining or smelting of rare earth metal ores. In all of the catalysts the yttrium and rare earth metal are trivalent. The catalyst preferably is at least slightly soluble in the molten lactide.

The group denoted Z bonded to the metal, M, is $-OCR'_3$ where each $-R'$ is independently chosen from hydrogen, hydrocarbyl of up to 50 carbon atoms and substituted hydrocarbyl of up to 50 carbon atoms. It is to be understood that in the group $-OCR'_3$ the carbon atom bound to the oxygen may be part of a non-aromatic carbocycle or non-aromatic heterocycle formed from that carbon and two of the $-R'$ groups. Preferred Z groups contain less than 50 carbon atoms and include isopropoxy, 2-ethoxyethoxy and 2-(N,N-dimethylamino)ethoxy.

It is understood that all of the above named Z groups bonded to yttrium or a rare earth metal can initiate polymerization, so that for each mole of catalyst $MZ_3$ present, up to three polymer chains can be produced.

In contrast to solution polymerizations disclosed in U.S. Pat. No. 5,028,667, we have found such catalysts to give incomplete reaction in the melt polymerization. Surprisingly, certain highly coordinating ligands such as 2,2,6,6-tetramethylheptane-3,5-dionate and acetylacetonate stabilize the catalysts, allowing complete conversion to high molecular weight polymer. Other highly coordinating ligands include fluoride, chloride, bromide, iodide, carboxylate, tetrasubstituted porphyrinato (-2), phthalcyanato (-2), beta keto ester anions such as methyl acetoacetate, dialkylmalonate ion, cyclopentadienide, pentamethylcyclopentadienide, and aryloxide such as phenoxide.

For use herein it is preferred that one Z is an active catalyst group such as $-OCH(CH_3)_2$, $-OCH_2CH_2OCH_2CH_3$ or $-OCH_2CH_2N(CH_3)_2$ and two Z groups are highly coordinating ligands, preferably 2,2,6,6-tetramethylheptane-3,5-dionate or acetylacetonate.

It will be understood by those skilled in the art that many of the compounds that are catalysts do not exist in simple monomeric form, but can be more highly coordinated or exist as "cluster compounds" or as "nonstoichiometric compounds". A review of yttrium and rare earth chemistry applicable to catalysts of the present invention is R. C. Mehrotra, P. N. Kapoor, and J. M. Batwara, *Chemical Reviews*, Vol. 31, (1980), pp 67-91. For a specific reference to the structure of yttrium alkoxides, see O. Pomlet et al., *Inorg. Chem.*, 1989, 28, 263-267. O. Pomlet et al., *J. Chem. Soc.*, Chem. Commun., 1989, 1846-1848. It is understood that even if such compounds do not exist as simple MZ₃ species, such compounds where the yttrium or rare earth metal is trivalent are included within the meaning of active catalysts, and are included within the meaning of structure MZ₃ in this specification. An example of such a cluster compound is Y₃[OC(CH₃)₂]₇Cl₂(THF)₂ in W. J. Evans and M. S. Sollberger, *Inorganic Coordination Chemistry*, Vol. 27(1988), pp 4417-4423.

The formula MZ₃ is also meant to encompass "complex" salts of yttrium and rare earth metals of the formula Me₂MZ₇, where M and Z have the meaning given above and Me is a divalent metal cation such as barium. Thus, the necessary elements in such compounds are trivalent yttrium or rare earth metal and one or more Z groups bound to them. Examples of such compounds are Ba₂Y[OCH₂CH₂N(CH₃)₂]₇ and Ba₂Y(OCH₂CH₂OCH₂CH₃)₇.

It will also be understood by those skilled in the art that if more than one type of Z group is present in a catalyst or mixture of two catalysts containing different Z groups is used, "redistribution" reactions may take place. By redistribution reactions is meant exchange of Z groups between metal atoms, so that it is possible, in theory, to obtain any combination of Z groups present on any particular metal atom.

By hydrocarbyl is meant any monovalent radical that contains only carbon and hydrogen. By substituted hydrocarbyl is meant any monovalent hydrocarbyl radical that contains other functional groups that do not substantially interfere with the reaction or react with any of the reactants or products. Suitable functional groups include halo, ester, ether, amino, thioether, silyl, hydroxy, carbon-carbon unsaturation (i.e., double or triple bonds) and aldehyde. Trivalent yttrium and rare earth compounds will not be stable if they contain a functional group whose pKa is less than that of the pKa of the conjugate acid of the functional group bonded to the yttrium or rare earth metal. A special case may arise when the two pKas are approximately equal. Then an equilibrium may exist as to which group is bound to the yttrium or rare earth metal, and if such groups fit the definition of Z above then both will initiate polymerization.

The polymerization of the present invention is carried out in the absence of any solvent in the molten lactide at from 100° to 220° C., preferably from 110° to 200° C. and most preferably from 165° to 180° C.

It is preferred to use a dry inert gas such as nitrogen or argon to blanket the reaction. Moisture is deleterious to the stability of the catalyst and can limit the molecular weight of the polymer produced. The starting materials should be dry. Drying methods are known to those skilled in the art, and include distillation from calcium hydride passage over molecular sieves or crystallization.

The preferred catalyst is lanthanum bis(2,2,6,6-tetramethylheptane-3,5-dionato)isopropoxide

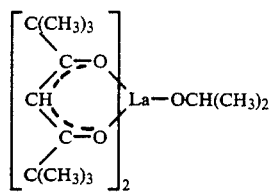

The catalyst must be stable at the reaction temperature which eliminates many of the known yttrium and rare earth metal compounds otherwise available.

The advantages of the process of the present invention are that it is faster, provides a narrow molecular weight distribution, provides a product with a better thermal stability as determined by weight loss at 200° C. and involves fewer side reactions as observed by color formation than many of the highly active catalysts in the literature.

EXAMPLE 1

5 g L-lactide, polymer grade, was melted in a flame-dried, nitrogen-flushed glass test tube suspended in a 165° C. vapor bath. 35 microliters of a 0.25M solution of lanthanum bis(2,2,6,6-tetramethylheptane-3,5-dionato)isopropoxide in tetrahydrofuran was injected via hypodermic syringe to give a monomer to catalyst molar ratio of 4000/1. The clear, colorless mixture becomes viscous immediately and shows no flow behavior after 1 minute. After an additional 1 minute, the tube was quenched in ice water to stop the reaction. Monomer conversion as measured by thermogravimetric analysis was 92%. The molecular weight (gel permeation chromatography in tetrahydrofuran vs. polystyrene standard) was Mp=107,000, Mw=146,000, Mn=57,000, and Mw/Mn=2.6.

EXAMPLE 2

Example 1 was repeated except the reaction temperature was 110° C. and the reaction time was 6 minutes. Monomer conversion was 98%. Mp=132,000.

EXAMPLE 3

Lanthanum bis(2,2,6,6-tetramethylheptane dionato) isopropoxide catalyst 5 g L-lactide, polymer grade, was melted in a frame-dried, nitrogen-flushed glass test tube suspended in a 110° C. vapor bath. 70 microliters of 0.25M tetrahydrofuran solution was injected via hypodermic syringe to give a monomer to catalyst molar ratio of 2000/1. The clear, colorless mixture exhibits no flow behavior after 3 minutes. After an additional 2 minutes the tube was quenched in ice water to stop the reaction. Monomer conversion as measured by thermogravimetric analysis was 93%.

EXAMPLE 4

Lanthanum bis(2,2,6,6-tetramethylheptane dionato) isopropoxide catalyst 5 g L-lactide, polymer grade, was melted in a flame-dried, nitrogen-flushed glass test tube suspended in a 165° C. vapor bath. 23.1 microliters of 0.25M tetrahydrofuran solution was injected via hypodermic syringe to give a monomer to catalyst molar ratio of 6000/1. The clear, colorless mixture increases rapidly in viscosity. After 2 minutes the tube was quenched in ice water to stop the reaction. Monomer conversion as measured by thermogravimetric analysis was 83%. Gel permeation chromatography in tetrahydrofuran vs. polystyrene standard gave Mw=124,000, Mn=53,000, and Mw/Mn=2.3.

EXAMPLE 5

Lanthanum bis(2,2,6,6-tetramethylheptane dionato) isopropoxide catalyst 5 g L-lactide, polymer grade, was melted in a flame-dried, nitrogen-flushed glass test tube suspended in a 165° C. vapor bath. 17.5 microliters of 0.25M tetrahydrofuran solution was injected via hypodermic syringe to give a monomer to catalyst molar ratio of 8000/1. The clear, colorless mixture increases rapidly in viscosity. After 2 minutes the tube was quenched in ice water to stop the reaction. Monomer conversion as measured by thermogravimetric analysis was 66%. Gel permeation chromatography in tetrahydrofuran vs. polystyrene standard gave Mw=89,000, Mn=42,000, and Mw/Mn=2.1.

EXAMPLE 6

Yttrium bis(2,2,6,6-tetramethylheptane dionato) isopropoxide catalyst 5 g L-lactide, polymer grade, was melted in a flame-dried, nitrogen-flushed glass test tube suspended in a 179° C. vapor bath. 87 microliters of 0.2M solution of yttrium bis (2,2,6,6-tetramethylheptane dionato) isopropoxide in 2-methyl-tetrahydrofuran was injected via hypodermic syringe to give a monomer to catalyst molar ratio of 2000/1. The clear, colorless mixture increases in viscosity, turning slightly yellow at about 2.5 minutes. After an additional minute the tube was quenched in ice water to stop the reaction. Monomer conversion as measured by thermogravimetric analysis was 82%. Gel permeation chromatography in tetrahydrofuran vs. polystyrene standard gave Mw=131,000, Mn=46,000, Mp=93,200 and Mw/Mn=2.8.

EXAMPLE 7

Yttrium bis(2,2,6,6-tetramethylheptane dionato) isopropoxide catalyst 5 g L-lactide, polymer grade, was melted in a flame-dried, nitrogen-flushed glass test tube suspended in a 179° C. vapor bath. 43.3 microliters of 0.2M solution of yttrium bis (2,2,6,6-tetramethylheptane dionato) isopropoxide in 2-methyl-tetrahydrofuran was injected via hypodermic syringe to give a monomer to catalyst molar ratio of 4000/1. The clear, colorless mixture increases in viscosity, turning slightly yellow at about 2.5 minutes. After an additional 3.5 minutes the tube was quenched in ice water to stop the reaction. Monomer conversion as measured by thermogravimetric analysis was 73%. Gel permeation chromatography in tetrahydrofuran vs. polystyrene standard gave Mw=117,000, Mn=49,000, and Mw/Mn=2.4.

EXAMPLE 8

Yttrium bis(2,2,6,6-tetramethylheptane dionato) isopropoxide catalyst 5 g L-lactide, polymer grade, was melted in a flame-dried, nitrogen-flushed glass test tube suspended in a 166° C. vapor bath. 87 microliters of 0.2M solution of yttrium bis (2,2,6,6-tetramethylheptane dionato) isopropoxide in 2-methyl-tetrahydrofuran was injected via hypodermic syringe to give a monomer to catalyst molar ratio of 2000/1. The clear, colorless mixture increases in viscosity, and after an additional 3.5 minutes the tube was quenched in ice water to stop the reaction. Monomer conversion as measured by thermogravimetric analysis was 76%. Gel permeation chromatography in tetrahydrofuran vs. polystyrene standard gave Mw=117,000, Mn=48,000, and

EXAMPLE 9

Di-iodo-Samarium-1-benzyl-n-octyloxide 5 g L-lactide, polymer grade, was melted in a flame-dried, nitrogen-flushed glass test tube suspended in a 166° C. vapor bath. 864 microliters of 0.04M solution of Di-iodo-Samarium alkoxide prepared according to J. Org. Chem., 49(11), p. 2045 (1984) from SmI$_2$, n-octanal and benzylbromide, was injected via hypodermic syringe to give a monomer to catalyst molar ratio of 1000/1. The clear, bright yellow mixture increases in viscosity, fading in color as the reaction proceeds. After 10 minutes the tube was quenched in ice water to stop the reaction. Monomer conversion as measured by thermogravimetric analysis was 65%. Gel permeation chromatography in tetrahydrofuran vs. polystyrene standard gave Mw=66,000, Mn=16,000, and Mw/Mn=4.1.

EXAMPLE 10

Yttrium bis(2,2,6,6-tetramethylheptane dionato)dimethylaminoethoxide 5 g L-lactide, polymer grade, was melted in a flame-dried, nitrogen-flushed glass test tube suspended in a 166° C. vapor bath. 217 microliters of 0.08M solution of yttrium bis(2,2,6,6-tetramethylheptane dionato) 2-dimethylaminoethoxide in toluene was injected via hypodermic syringe to give a monomer to catalyst molar ratio of 2000/1. The clear, colorless mixture increases in viscosity, and after 10 minutes the tube was quenched in ice water to stop the reaction. Monomer conversion as measured by thermogravimetric analysis was 51%. Gel permeation chromatography in tetrahydrofuran vs. polystyrene standard gave Mw=96,000, Mn=48,000, and Mw/Mn=2.0.

COMPARATIVE EXAMPLE 1

Polymerization using one of the catalysts preferred for solution polymerization 2 g L-lactide, polymer grade, was melted in a flame-dried, nitrogen-flushed glass test tube suspended in a 165° C. vapor bath. 11 microliters of a 1.0M solution of yttrium tris (N,N-dimethylaminoethoxide) in tetrahydrofuran was injected via hypodermic syringe to give a monomer to catalyst molar ratio of 1250/1. The clear, colorless mixture turns yellow upon mixing and shows very little viscosity increase through 10 minutes, when the tube was quenched in ice water to stop the reaction. Monomer conversion as measured by thermogravimetric analysis was only 43%. After precipitation of a methylene chloride solution of the reaction mixture into 10 volumes of methanol, gel permeation chromatography in tetrahydrofuran vs. polystyrene standard) gave Mw=33,000, Mn=24,000, and Mw/Mn=1.4.

Having thus described and exemplified the invention with a certain degree of particularity, it should be appreciated that the following claims are not to be so limited but are to be afforded a scope commensurate with the wording of each element of the claim and equivalents thereof.

We claim:

1. A process for polymerizing lactide comprising melting at 100° to 220° C. a lactide and up to 20 mole percent of another lactone of the formula

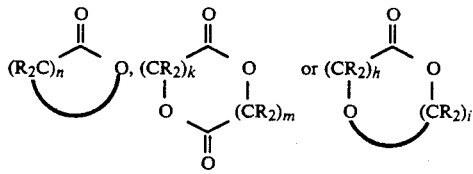

where n is 4 or 5, h, i, k and m are independently 1 or 2, each R is independently selected from H or hydrocarbyl containing up to 12 carbon atoms or substituted hydrocarbyl containing up to 12 carbon atoms with a catalyst of the formula $MZ_3$, wherein M is yttrium or a rare earth metal and one Z is $-OCR'_3$ where R' is independently hydrogen, hydrocarbyl or substituted hydrocarbyl, the remaining two Zs are fluoride, chloride, bromide, iodide, carboxylate, tetrasubstituted porphyrinato (-2), betadiketone anions, beta keto ester anions, cyclopentadienide, phenoxide or pentamethylcyclopentadienide, and cooling the resulting polymer.

2. The process of claim 1 wherein the mole ratio of monomer to catalyst is from 500 to 20,000.

3. The process of claim 2 wherein a lactide homopolymer is produced.

4. The process of claim 1 wherein the R in the lactone co-monomer is H or $CH_3$.

5. The process of claim 4 wherein the mole ratio of monomer to catalyst is from 500 to 20,000.

6. The process of claim 1 wherein the lactone co-monomer is epsilon-caprolactone, delta-valerolactone, glycolide, 1,5-dioxepan-2-one or 1,4-dioxan-2-one.

7. The process of claim 6 wherein the mole ratio of monomer to catalyst is from 500 to 20,000.

8. The process of claim 1 wherein the polymerization is carried out at 110° to 200° C.

9. The process of claim 1 wherein two of the -Zs are 2,2,6,6,-tetramethylheptane dionato, or acetylacetonate.

10. The process of claim 9 wherein the third -Z is isopropoxy, 2-ethoxyethoxy or 2-(N,N-dimethylamino)ethoxy.

11. The process of claim 1 wherein M is lanthanum.

12. The process of claim 9 wherein M is lanthanum.

13. The process of claim 12 wherein the third Z is isopropoxy, 2-ethoxy ethoxy, or 2-N,N-dimethylethoxy.

14. The process of claim 1 wherein the polymerization is carried out at 165° to 180° C.

* * * * *